July 8, 1952 — W. M. WHEILDON, JR — 2,602,714

BEARING COMBINATION

Filed March 24, 1950

Inventor
WILLIAM MAXWELL WHEILDON, JR
By George C. Houghton
Attorney

Patented July 8, 1952

2,602,714

UNITED STATES PATENT OFFICE 2,602,714

BEARING COMBINATION

William Maxwell Wheildon, Jr., Framingham, Mass., assignor to Norton Company, Worcester, Mass., a corporation of Massachusetts Application March 24, 1950, Serial No. 151,534

3 Claims. (Cl. 308—242)

The invention relates to a journal bearing combination, that is to say a journal and a bearing therefor and also a bearing combination where there is no journal.

One object of the invention is to provide a journal bearing combination the parts of which will maintain their dimensions during the long periods of operation. Another object of the invention is to provide a journal bearing combination to meet unusual service conditions. Another object of the invention is to provide a journal bearing combination which will run dry without failure. Another object of the invention is to provide a journal bearing combination which will operate properly and without unreasonable wear with such unusual lubricants as water and steam. Another object of the invention is to provide a journal bearing combination operable at high speeds and under high pressures. Another object of the invention is to provide a journal bearing combination which will not deteriorate at high temperatures. Another object is to provide a journal bearing combination of extremely long life in which the two elements thereof show little wear after long periods of operation with the usual lubricants such as various oils. Another object is to provide a journal bearing combination which will not freeze even under heavy loads and at high speeds. Another object is to provide a journal bearing combination which will not conduct electricity. Another object is to provide a bearing combination (involving no journal, such as in the case of flat bearings) having one or more of the above features and advantages. Another object is to provide a bearing combination, whether journal bearing combination or involving flat bearings or any other species, the elements of which are usually resistant to acids and other corrosives including in this connection water, which rusts iron and many steels, whereby the bearing combination will not be affected by any liquids.

Other objects will be in part obvious or in part pointed out hereinafter.

Figure 1:
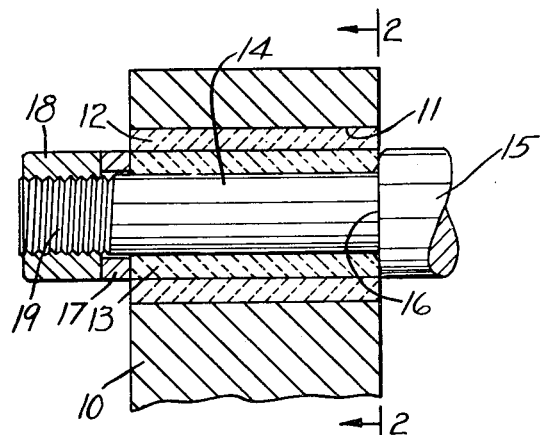
Figure 2:
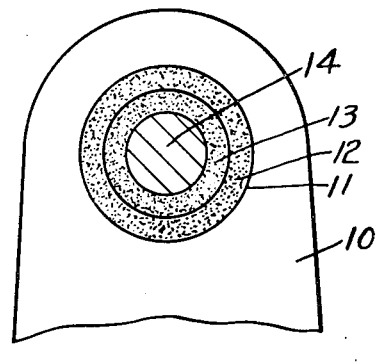
Figure 3:
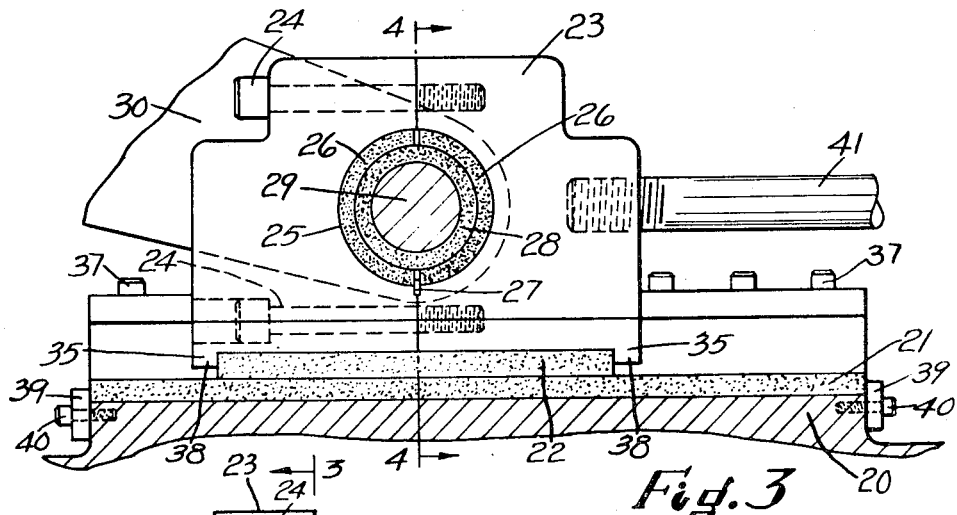
Figure 4:
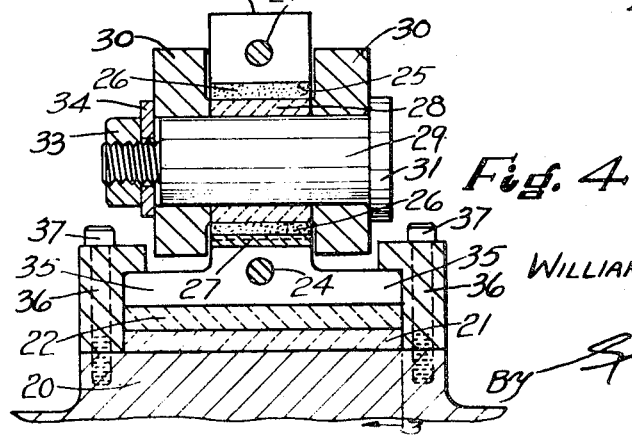

In the accompanying drawings illustrating some of the many possible embodiments of the invention:

Figure 1 is an axial sectional view of a shaft having a journal piece thereon rotatably supported by a bearing, Figure 2 is a vertical sectional view taken on the line 2—2 of Figure 1, Figure 3 is an elevation of a piston rod guide and slideway therefor (the latter in section) showing a sliding thrust plate attached to the piston rod guide and a slideway supporting plate held by the slideway, Figure 4 is a vertical sectional view taken on the line 4—4 of Figure 3.

The journal bearing combination of the present invention is aluminum oxide and silicon carbide. By aluminum oxide I mean a massive piece of crystalline aluminum oxide made by uniting, under heat and pressure, granules of previously fused alumina. That is to say, in the known art of making abrasive and refractory aluminum oxide, a quantity of the material is melted in an electric furnace, then it is allowed to solidify and finally it is crushed or otherwise disintegrated to form granules of any desired grit size. Sometimes the starting material is bauxite, a hydrated aluminum oxide, together with enough carbon to reduce the other oxides present and together with enough iron to unite with the silicon reduced from silica to form a ferrosilicon which goes to the bottom of the pig or ingot. At other times the fusion is a fusion of relatively pure aluminum oxide made by chemical processes which, however, lacks the desired physical characteristics until it is fused and allowed to crystallize from molten phase.

It is now possible to take a quantity of granular aluminum oxide having a purity of 97% $Al_2O_3$ or better, place this in a suitable mold and mold the granular material to a solid body by the application of pressure coincident with heating. Preferably part of my journal bearing combination is made out of such aluminum oxide or alumina. However the making of bearings by casting the molten alumina is not precluded.

The other part of the journal bearing combination according to this invention is vitrified ceramic bonded silicon carbide. The silicon carbide should be 95% pure or better and can be made by the well known process of reducing silica with carbon using an excess of carbon to unite with the silicon vapors to produce silicon carbide SiC, this process being carried out in a resistance type of electric furnace as developed by E. G. Acheson before the beginning of the present century. Silicon carbide so produced is a friable mass of large crystals and this mass is crushed to produce fine grit of fractured silicon carbide crystals which are then mixed with clay or clays with or without a flux such as feldspar and often with some frit. Water is added to make the mixture moldable and the mixture is then placed in a suitable mold and pressed, the "green" pieces are stripped from the mold, drier and finally fired to vitrify the bonding material, the heat treatment being usually cone 12 heat treatment. The term frit, well known in the ceramic arts, designates ceramic material made by mixing clay or clays and/or other ingredients, fusing, quenching in water or otherwise, and finally crushing. Frit is ground glass.

In case the journal bearing combination is for supporting a rotating shaft and in some cases where a reciprocating shaft is cylindrical and reciprocates in a bearing the outer piece is preferably aluminum oxide and the inner piece is preferably silicon carbide. However in cases where the combination is for the support of a reciprocating part which is free to move in one direction normal to the reciprocation it makes no difference which is the outer part and which is the inner part. The coefficient of expansion of aluminum oxide is about $7.0 \times 10^{-6}$ per degree centigrade. The coefficient of expansion of vitrified ceramic bonded silicon carbide is about $4.5 \times 10^{-6}$ per degree centigrade. Thus in the case of a journal within a bearing, by having the aluminum oxide piece on the outside, any heating of the parts causes the outside part to expand more than the inside part thus preventing freezing. However, in certain instances where excessive heat will not be generated the arrangement can be reversed.

Referring now to Figures 1 and 2, a bearing support 10 has a cylindrical bore 11 in which is press fitted a sleeve 12 of massive aluminum oxide. This sleeve 12 is the bearing and in it runs a sleeve 13 of vitrified ceramic bonded silicon carbide which is the journal. This sleeve 13 is fitted on the reduced portion 14 of a rotatable shaft 15. At the end of the reduced portion 14 is a shoulder 16 against which the sleeve 13 is held by means of a washer 17 and a nut 18 on a threaded end 19 of the shaft 15.

Referring now to Figures 3 and 4, the base of a steam engine or pump has an integral land 20 supporting a slideway supporting plate 21 of massive aluminum oxide upon which rests a slide thrust plate 22 of vitrified ceramic bonded silicon carbide which supports a two part block 23 held together by bolts 24. The block 23 has a cylindrical bore 25 holding two semi-cylindrical sleeve portions 26 of massive aluminum oxide which are held from rotating relative to the block 23 by a gib 27. These two semi-cylindrical sleeve portions of massive aluminum oxide constitute a bearing which supports a journal 28 on a pin 29 passing through the forked end 30 of a connecting rod. The pin 29 has a head 31 at one end and a screw threaded portion at the other end on which is a nut 33 thrusting against a washer 34 which abuts the forked end 30. Thus the journal 28 is tightly secured to the forked end 30 of the connecting rod and the journal 28 is oscillatable within the bearing 26 and in this instance the journal 28 is made of vitrified ceramic bonded silicon carbide.

The two part block 23 as best shown in Figure 4 has a wide portion 35 just above the slide thrust plate 22 which is guided by L-shaped slideway guides 36 held onto the land 20 by means of bolts 37. However there is a good sliding clearance between the L-shaped slideway guides 36 and the enlarged portion 35 of the two part block 23. Lug portions 38 overlap the ends of the plate 22 and hold it in position. Similarly lugs 39 secured by bolts 40 to the land 20 hold the slideway supporting plate 21 in position.

If the apparatus of Figures 3 and 4 is a slideway and piston rod guide for the piston rod 41 of a pump, for example an air pump, the crank not shown connected to the connecting rod of which the forked end 30 is shown will rotate clockwise and the resultant thrust on the block 23 will be downward. If, on the other hand, the apparatus is a slideway and piston rod guide for the piston rod 41 of a steam engine, the crank will be rotated counterclockwise and the thrust will still be downward. Thus the bearing combination of Figures 3 and 4 is a sliding thrust plate bearing combination. In such a combination it makes no difference which part is aluminum oxide and which part is silicon carbide. The slide thrust plate bearing combination of this invention can be used in many other situations, that illustrated being merely one common use for a sliding thrust plate bearing combination.

Figures 3 and 4 also illustrate a journal bearing combination for the articulation of parts one of which oscillates relative to the other and they also illustrate the case of a split bearing. The journal bearing combination of the invention can be used with superior results for the rotatable or oscillatable support of machine parts where the thrust is radial and also where the thrust is axial. Accordingly the three embodiments herein depicted and described are to be taken as purely illustrative since the combination of the invention can be embodied in any known mechanical arrangement of relatively moving parts.

For the fabrication of the journals, the bearings and the plates, both stationary and moving, molding, as already fully understood in the ceramic and refractory arts, is preferably utilized. For finishing the surfaces that are to be in contact with relatively moving surfaces grinding wheels, particularly diamond grinding wheels, are preferably used. Grinding may be followed with lapping and in this manner beautiful mirror-like surfaces can be produced on the hard materials herein specified. Naturally in the case of journal bearing combinations the fit should be the best that can be achieved allowing just enough clearance for free rotation and for a film of oil or water. The journal bearing combination and also the sliding thrust plate bearing combination of the invention are preferably lubricated with oil, but so perfect are the surfaces when ground and lapped, so hard are the materials and so immune are they in the combination specified to the effects of seizure that they can run dry under considerable loads and at high speeds for a long time without deterioration. This capability is a great advantage in many situations. For the manufacture of a split bearing such as the semi-cylindrical sleeve portions 26 a full bearing is first made, then ground, then lapped, and finally it is split into two pieces with a diamond cutoff wheel.

Tests were made of the resistance to wear of the combination of this invention and of other combinations. In each test a disc four inches in diameter and one-eighth of an inch thick was rotated with its periphery against a flat block, with a speed of rotation of 650 R. P. M. and a load of six pounds, for a total time of two hours and with no lubricant, the test conditions being the same in every case, with the following results as to total wear on both the disc and the block.

TABLE I

| Disc | Block | Total Wear Cubic Millimeters |
|---|---|---|
| Bonded Silicon Carbide | Aluminum Oxide | 2.60 |
| Boron Carbide | Boron Carbide | 7.00 |
| Hard Steel | Hard Steel | 17.00 |
| Hard Steel | Tungsten Carbide | 22.00 |
| Aluminum Oxide | Zirconium Oxide | 36.00 |
| Hard Steel | Bronze | 43.00 |

One advantage of the combination of the invention is that both elements are refractory as well as hard. By elements in this connection I mean the journal and bearing or the two bearing parts. Furthermore the elements will not deteriorate nor lose their wear resistant properties even if heated to a temperature of 1000° F. Another advantage of the combination of this invention is that, as a combination, it is an electrical insulator which is a desired feature for many modern machines.

Generically a journal is a bearing, so therefore generically this invention concerns a bearing combination, one element being bonded silicon carbide (as defined) and the other element being aluminum oxide (as defined). The journal bearing combination is a specific case. Slideway supporting plates and slide thrust plates are other specific cases since each is a bearing element. Each of the elements of the bearing combination is highly resistant to acids and other corrosives.

As a further aid to practicing the invention I will give some specific examples of vitrified ceramic bonded silicon carbide compositions actually used in carrying out my invention.

*Example I*

| | Pounds |
|---|---|
| 100 mesh grit size silicon carbide | 11.2 |
| 500 mesh grit size silicon carbide | 4.8 |
| Ceramic bond | 11.9 |
| Water | 1.9 |

The ceramic bond of Example I had the following composition:

*Example II*

| | Pounds |
|---|---|
| Mississippi ball clay | 45.0 |
| Colemanite | 20.0 |
| Lithospar | 36.0 |
| Silicon | 1.0 |
| Aluminum | 2.5 |

*Example III*

| | Pounds |
|---|---|
| 30 mesh grit size silicon carbide | 6.4 |
| 100 mesh grit size silicon carbide | 4.8 |
| 500 mesh grit size silicon carbide | 4.8 |
| Ceramic bond of Example II | 6.9 |
| Water | 1.1 |

The pieces made with the ingredients of Example I as the result of pressing and firing had 50 volume per cent silicon carbide, 46.5 volume per cent vitrified ceramic bond, the remainder pores. The pieces made with the ingredients of Example III as the result of pressing and firing had 63 volume per cent silicon carbide, 33 volume per cent vitrified ceramic bond, the remainder pores. For the purpose of this invention the variation in volume percentage of silicon carbide, ceramic bond and pores should be within the following limits.

TABLE II

| | Volume percentage range |
|---|---|
| Silicon carbide | 40 to 70 |
| Vitrified ceramic bond | 20 to 60 |
| Pores | 0 to 20 |

It will thus be seen that there has been provided by this invention a bearing combination in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. A bearing combination consisting of two elements, one of said elements being a massive piece of crystalline aluminum oxide at least 97% pure having a ground bearing surface, and the other of said elements being a piece of silicon carbide bonded with vitrified ceramic bond said piece having a ground bearing surface and said piece in volume percentage ranging from 40% to 70% silicon carbide, from 20% to 60% of said bond, and from 0% to 20% pores.

2. A bearing combination according to claim 1 in which one element is a journal and is the inner element and is the piece of vitrified ceramic bonded silicon carbide.

3. A bearing combination according to claim 1 in which one element is a slideway and the other element is a slide plate.

WILLIAM MAXWELL WHEILDON, Jr.

REFERENCES CITED

The following references are of record in the file of this patent:

UNITED STATES PATENTS

| Number | Name | Date |
|---|---|---|
| 2,482,205 | Potts | Sept. 20, 1949 |